July 21, 1959  M. MAYER  2,895,516
OSCILLATING ADJUSTABLE STROKE MORTISING MACHINE
Filed Jan. 5, 1956  5 Sheets-Sheet 1

INVENTOR.
Max Mayer
BY Barthel & Bugbee
Attys

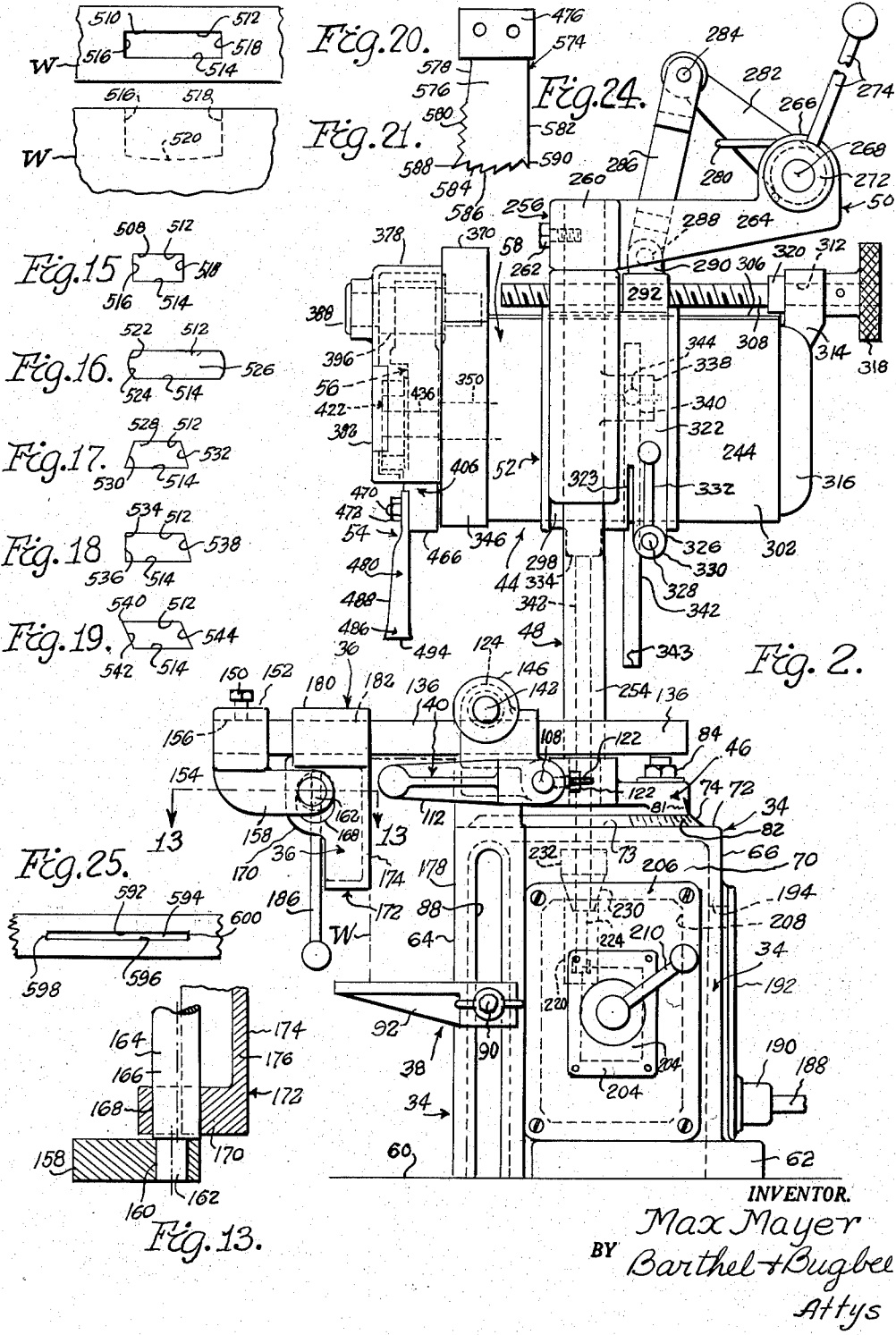

July 21, 1959 M. MAYER 2,895,516
OSCILLATING ADJUSTABLE STROKE MORTISING MACHINE
Filed Jan. 5, 1956 5 Sheets-Sheet 3
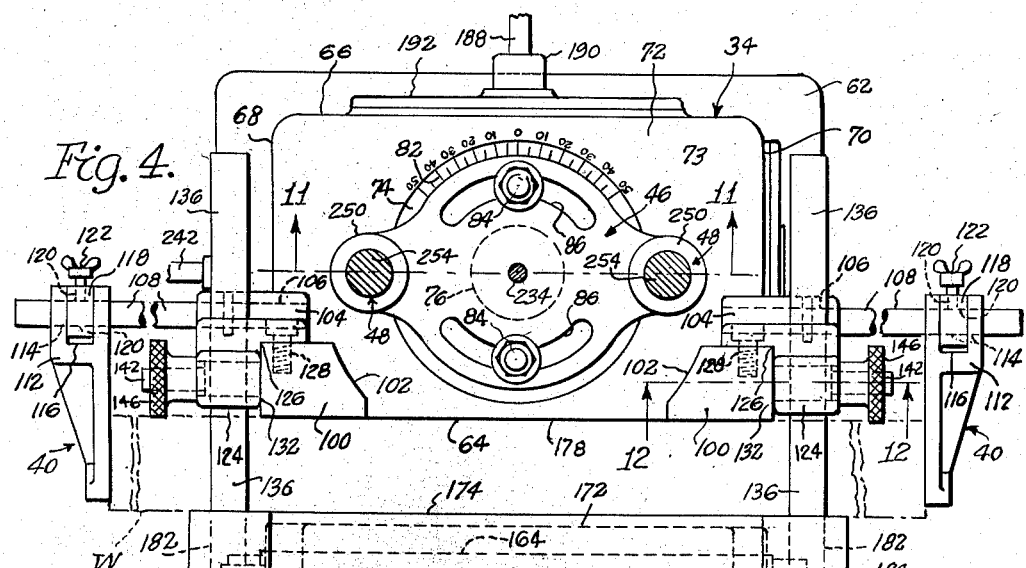
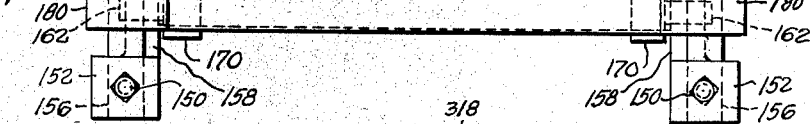
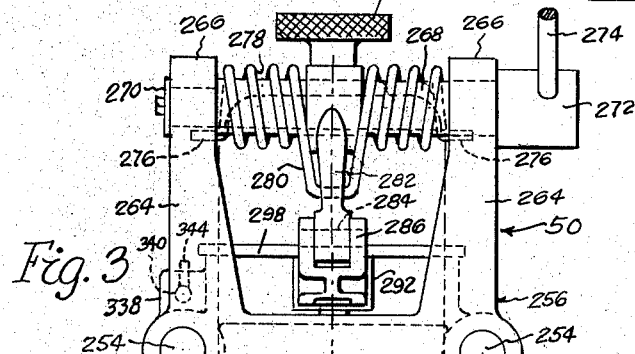
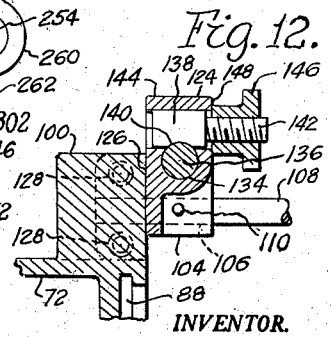
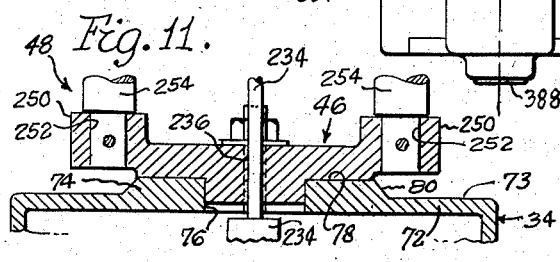
INVENTOR.
Max Mayer
BY Barthel + Bugbee
Attys

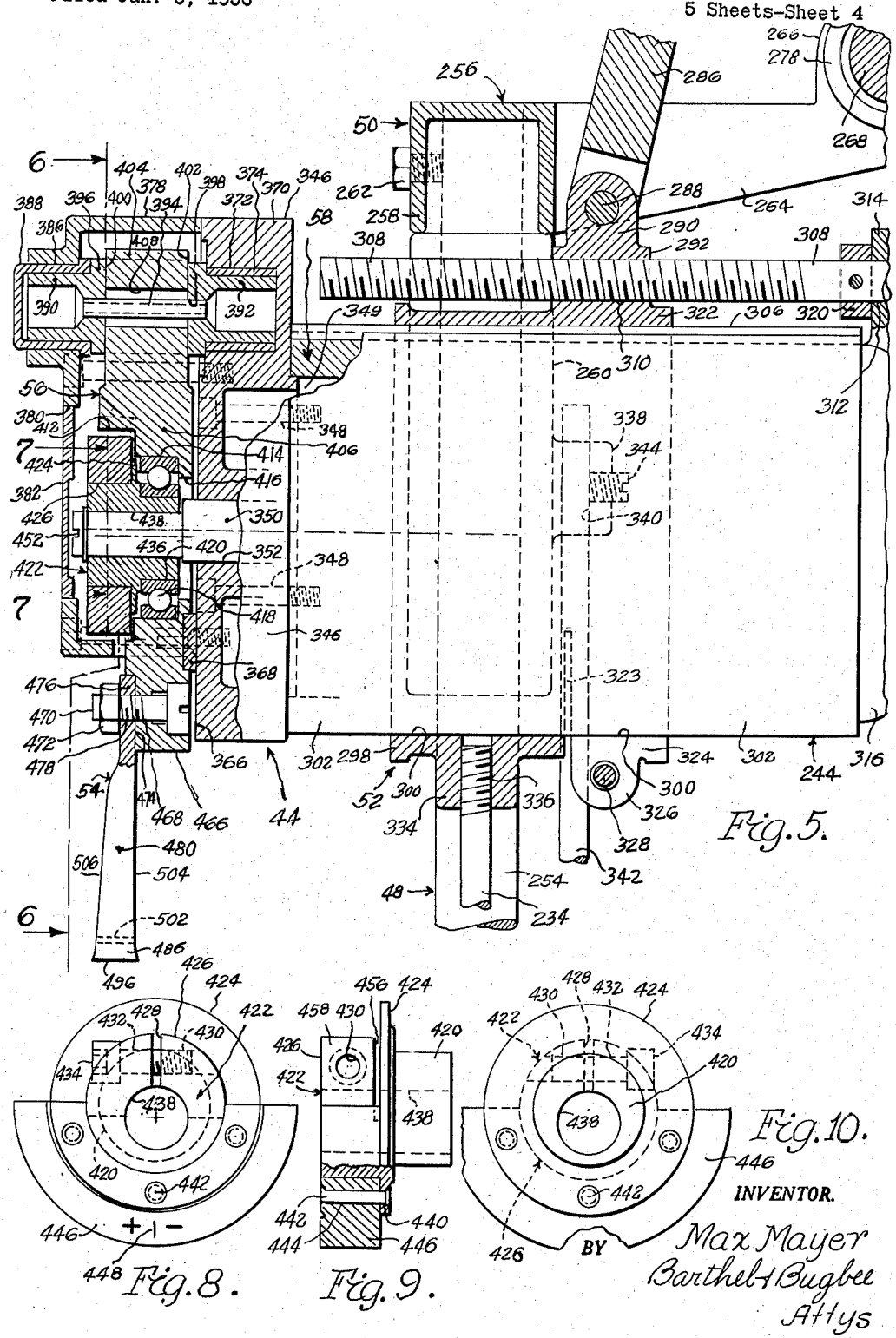

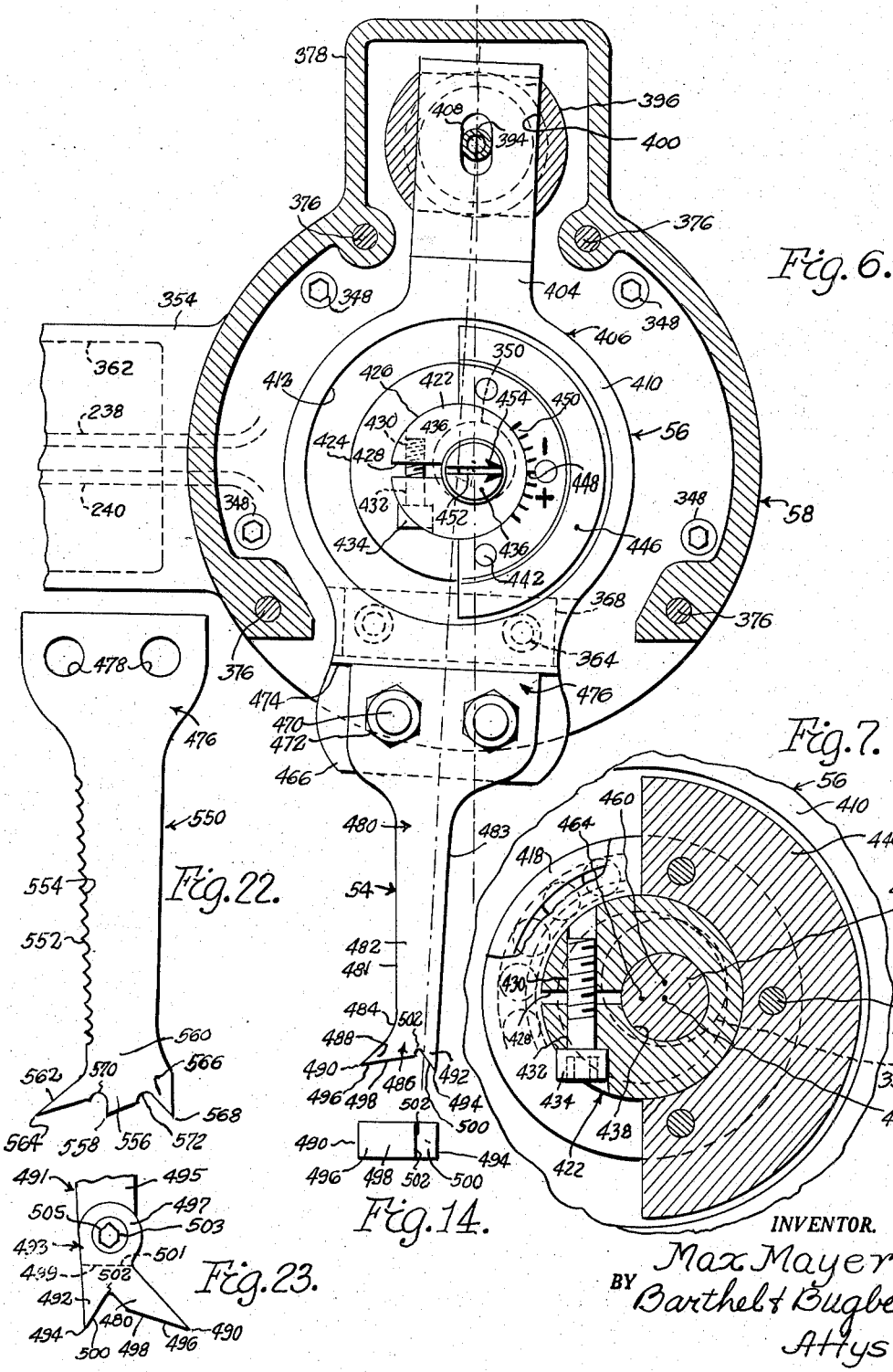

United States Patent Office 2,895,516
Patented July 21, 1959

2,895,516

OSCILLATING ADJUSTABLE STROKE MORTISING MACHINE

Max Mayer, Neu-Ulm, Germany

Application January 5, 1956, Serial No. 557,609

8 Claims. (Cl. 144—80)

This invention relates to cutting machines and, in particular, to mortising machines.

One object of this invention is to provide a mortising machine which will quickly and accurately cut recesses such as mortises or slots in wood, metal, plastic or other suitable material with a minimum of adjustment required and make an indefinite number of slots of similar shape in rapidly repeated sequence under mass production conditions, so that the cost of manufacturing articles using such slots or recesses is greatly reduced from the costs of articles manufactured by prior machines.

Another object is to provide a mortising machine of the foregoing character which is adapted to produce multiple mortises, recesses or slots with parallel opposite side walls and with end walls of any desired shape or angle, merely by selecting and mounting in the machine a mortising tool.

Another object is to provide a mortising machine of the foregoing character having a tool mount which is oscillated through a stroke of adjustable length, the stroke being varied by a simple adjustment which is quickly and easily made on the machine.

Another object is to provide a mortising machine, as set forth in the object immediately preceding, wherein the tool mount receives mortising tools having interchangeable bases but different shapes of cutting heads, change of mortising tools being made merely by unbolting or otherwise detaching the base of one tool and bolting on another interchangeable tool in its place.

Another object is to provide a mortising machine of the foregoing character having an improved work-holding device wherein the workpiece is quickly and tightly clamped in position for mortising, yet is quickly and easily unclamped and replaced by new workpieces in rapid succession, rapidly and easily adjusted stops being provided for positioning the workpiece both vertically and horizontally in such a manner that a large number of workpieces of the same size and shape can be mortised in rapid succession under mass production conditions at a very low cost of production.

Another object is to provide a mortising machine of the foregoing character wherein the oscillatable tool mount together with its driving mechanism and motor is adjustably supported on a frame which is rotatable precisely relatively to a machine base carrying the workpiece clamping device and workpiece positioning stops so that obliquely-positioned slots or recesses may be cut in rapid succession after the machine has been quickly and easily adjusted to the desired angle of cut.

Another object is to provide a mortising machine as set forth in the object immediately preceding, wherein the cutting unit on which the mortising tools are mounted and by which they are driven is adjustable not only in a vertical direction but also horizontally in a direction perpendicular to the longitudinal axis of the clamping device and therefore of the workpiece, thereby enabling slots or recesses to be formed at different distances from the edge of the workpiece, but also enabling a plurality of them to be formed parallel to one another across the workpiece.

Another object is to provide a mortising tool of the foregoing character which is especially well adapted for the production of long narrow slots or recesses, the lower end as well as the forward edge or leading edge of the cutting blade of the tool being provided with cutting and chip-expelling teeth respectively, so that the narrow elongated slot or recess is formed almost instantly and the chips simultaneously expelled therefrom.

Another object is to provide a mortising machine of the foregoing character wherein the mortising tools are so shaped as to automatically expel the chips from the recess or slot which they cut as rapidly as the recess is formed, leaving the recess or slot clean and substantially free from chips.

Another object is to provide a mortising tool of the foregoing character having a shank to which are removably bolted replaceable and interchangeable cutting heads, thereby enabling different cutting heads to be used on the same shank for different cutting conditions or shapes.

Other objects and advantages of the invention will become apparent during the course of the following description of the accompanying drawings, wherein:

Figure 2 is a right-hand side elevation of the mortising machine shown in Figure 1;

Figure 3 is a top plan view of the cutting unit of the mortising machine shown in Figures 1 and 2;

Figure 4 is a horizontal section taken along the line 4—4 in Figure 1, showing the machine base, workpiece stops and clamping mechanism together with the rotary or angular adjustment for the cutting unit shown in Figure 3;

Figure 5 is an enlarged vertical section through the cutting unit taken along the line 5—5 in Figure 1, with the driving motor mainly in side elevation;

Figure 6 is a vertical cross-section through the cutting unit shown in Figure 5, taken along the line 6—6 in Figure 5, with the mortising tool at the forward end of its stroke;

Figure 7 is an enlarged vertical cross-section through the eccentric stroke-adjustment mechanism, taken along the line 7—7 in Figure 5;

Figure 8 (Sheet 4) is a front elevation of the eccentric and counterweight unit shown in Figures 6 and 7, but removed from the machine;

Figure 9 is a side elevation, partly in central vertical section, of the unit shown in Figure 8;

Figure 10 is a rear elevation of the unit shown in Figures 8 and 9;

Figure 11 (Sheet 3) is a fragmentary central vertical section through the turntable and adjacent parts of the base, taken along the line 11—11 in Figure 4;

Figure 12 is a fragmentary vertical section through one of the workpiece vise rod clamping devices, taken along the line 12—12 in Figure 4;

Figure 13 (Sheet 2) is a fragmentary horizontal section through the horizontal eccentric workpiece vise jaw clamping device taken along the line 13—13 in Figure 2;

Figure 14 (Sheet 5) is a bottom plan view of the mortising tool shown in side elevation in Figure 6, removed from the machine;

Figure 1:
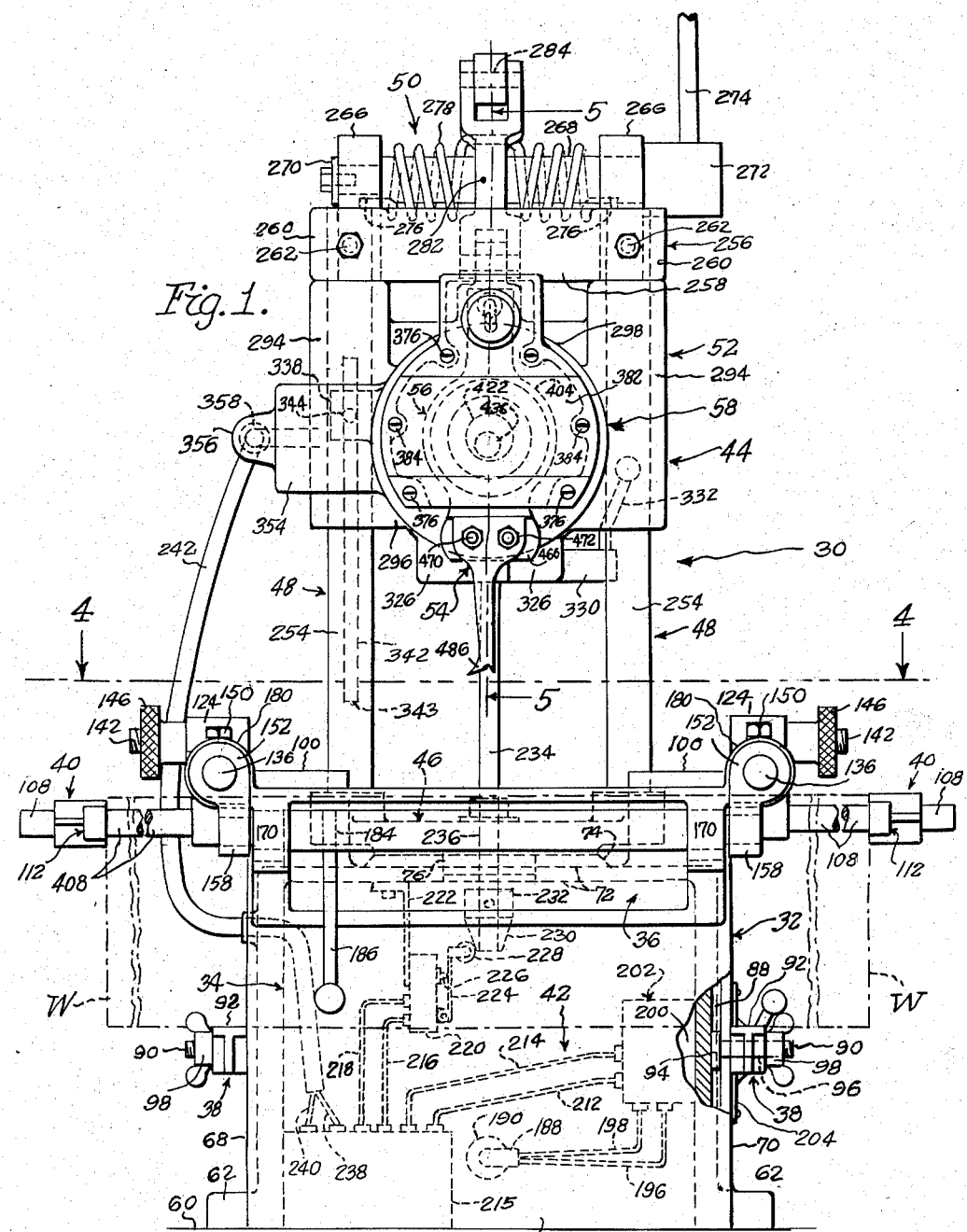
Figure 1 is a front elevation of a mortising machine, according to one form of the invention, with one of the workpiece bottom stops in section and with the workpiece end stops and workpiece shortened to enable compactness of the drawing, the mortising tool being shown in its mid-stroke position.

Figures 15 to 19 inclusive (Sheet 2) are top plan views of slots or recesses, such as mortises of varying shapes produced by cutting tools of the general type shown in Figures 2, 5, 6 and 14, but with correspondingly-shaped mortising tool tips;

Figure 20 is a fragmentary top plan view of a workpiece with an elongated rectangular mortise therein;

Figure 21 is a fragmentary side elevation of the mortised workpiece of Figure 20, showing the slightly arcuate curvature of the bottom of the recess or mortise;

Figure 22 (Sheet 5) is a side elevation of a modification of the mortising tool shown in Figures 1, 2, 5 and 7;

Figure 23 is a fragmentary side elevation of the lower end of the blade of a modified mortising tool having a replaceable cutting head;

Figure 24 (Sheet 2) is a side elevation of a further modified mortising tool adapted to cut long narrow slots or recesses such as mortises; and Figure 25 is a fragmentary top plan view showing a portion of a workpiece provided with a mortise or slot formed by the modified mortising tool of Figure 22.

*General arrangement*

In general, the mortising machine of the present invention consists of a hollow base having a workpiece-clamping vise thereon together with adjustable workpiece bottom and end stops, and the necessary switches and relay, whereby the driving motor is automatically stopped by the action of a limit switch when the cutting unit is raised and automatically started when the cutting unit is lowered, in order to prevent injury to the workman. Rotatably mounted on the base is a turntable (Figures 2, 4 and 11) carrying a pair of vertical parallel guide rods or uprights along which the cutting unit carriage is raised or lowered by a hand lever and linkage mounted on a bridge member at the top of the guide rods. The cutting unit is adjustable horizontally relatively to its carriage (Figures 2 and 5) by a screw shaft and hand wheel.

The cutting unit consists of an electric motor having an eccentric portion formed on its motor shaft (Figure 5) which in turn carries an eccentric and counterweight unit (Figures 8 to 10) adjustable relatively thereto for adjustment of the stroke of the mortising tool. The eccentric and counterweight unit is in turn rotatably mounted within an oscillating arm which is pivotally and vertically-reciprocably guided on a pivot shaft while the pivot shaft is supported in spaced sleeve bearings or trunnions (Figures 5 and 6), whereas the lower end of the oscillating arm is provided with a tool mounting portion to which interchangeable mortising tools are bolted or otherwise secured. These mortising tools are provided with a common or standard base to which are attached cutting blades of different shapes adapted to produce different shapes of mortise or slot, as shown in Figures 15 to 21 and 24. When the motor is started so as to rotate the eccentric portion on the end of its shaft, the eccentric unit clamped thereto produces an up-and-down reciprocation of the oscillating arm (Figure 6) combined with a sidewise reciprocation thereof, with the result that the cutting tip or end of the cutting blade of the mortising tool oscillates at high speed in an approximately oval path, the length of the oval and consequently the length of the stroke being adjusted by unclamping the outer eccentric unit and rotating it relatively to the eccentric motor shaft end with reference to an index slot on the motor shaft eccentric and registering with an arcuate scale on the counterweight.

The stroke having been set to the desired length, the lowering of the cutting head carriage to the workpiece clamped in the workpiece holding vise on the machine base cuts a mortise or slot at great speed and at the same time expels the chips, leaving a clean hole in the workpiece. The cutting unit carriage also carries a switch-operating rod which actuates a limit switch to start the motor when the carriage is lowered and to stop the motor when the carriage is raised, for safety purposes.

More details of the adjustment, operation and advantages of the machine, together with its versatility for cutting widely different types of slots or mortises, are described below in connection with the detailed operation of the machine.

Referring to the drawings in detail, by reference numerals of general designation, the mortising machine, generally designated 30, shown in full in Figures 1 and 2, consists generally of a base assembly 32 including a hollow base 34 carrying a work clamping unit 36 for workpieces W, workpiece bottom stops 38, workpiece end stops 40 and a motor control circuit 42. Rotatably mounted on the base 34 is a cutting assembly, generally designated 44, including a turntable, generally designated 46, with an upright guide structure 48 mounted thereon and carrying a carriage raising and lowering unit 50 (Figures 1, 2 and 3) by which a cutting unit carriage 52 is raised and lowered. The cutting unit carriage 52 in turn carries a horizontally-adjustable cutting unit, generally designated 58, which by means of a tool-oscillating mechanism, generally designated 56 (Figures 5 and 6) oscillates the mortising tool, generally designated 54, bolted to the lower end thereof.

*Base assembly and associated units*

In the base assembly 32, the base 34 is a hollow box-shaped casting here shown as bench-mounted on the surface 60 of a bench or table but capable, by being vertically elongated, of being mounted on the floor, according to the shop conditions. The base 34 has mounting flanges or lugs 62 which receive conventional bolts, lag screws or other suitable fasteners by which the base 34 is secured to the mounting surface 60. The base 34 has front and rear walls 64 and 66 and opposite end walls 68 and 70 together with a top wall 72 (Figure 11) from the top surface 73 of which rises a boss or turntable mount 74 having a central bore 76 and machined circular top surface 78 for rotatably supporting the turntable 46, the side edge 80 being provided with angular graduations 82 (Figure 4) enabling the turntable 46 to be accurately positioned angularly around a vertical axis of rotation consisting of the axis of the bore 76. The turntable 46 carries an index mark 81 (Figure 2) which registers with the degree scale 82 in order to enable accurate angular setting of the turntable 46 relatively to the base 34. The top wall 72 of the base 34 is bored and threaded vertically to receive diametrically opposite clamping bolts 84 which pass through arcuate slots 86 in the turntable 46 (Figure 4) so as to clamp the turntable 46 in its angularly-adjusted position.

The opposite end walls 68 and 70 of the base 34 are provided with parallel vertical T-slots 88 in which the heads of clamping bolts 90 are slidably mounted (Figures 1 and 2) and which carry horizontal workpiece bottom stop arms 92 forming a part of the workpiece bottom stops 38. In order to maintain the stop arms 92 accurately perpendicular to their slot 88 and therefore accurately horizontal in their various positions of adjustment, each stop arm 92 is provided with a rectangular boss 94 (Figure 1) projecting into the mouth of the slot 88 and guided for vertical reciprocation between its opposite edges. The bottom stop arms 92 are bored horizontally as at 96 for the passage of the clamping bolts 90, clamping being effected by wing nuts 98 threaded onto the bolts 90. In this manner, the bottom stops 38 may be adjusted vertically so as to properly position the bottom of a workpiece W, here shown in dotted lines as a wooden plank of elongated cross-section mounted vertically on the bottom stops 38.

Rising from the top wall 72 of the base 34 adjacent the opposite end walls 68 and 70 and thereof at their forward corners are two laterally-spaced upstanding bosses 100 cut away arcuately as at 102 to provide clearance for the turntable 46. The bosses 100 are provided with rearward extensions 104 (Figure 4) which are bored horizontally with aligned bores 106 in which end stop rods 108 of the ends stops 40 are fixedly secured, as by pins 110 (Figures 12). Slidably mounted on the horizontal stop rods 108 are end stop arms 112 which are bored with aligned holes 114 for the passage of the rods 108 and notched centrally as at 116 to receive a clamping block 118 which is also bored at 120 (Figure 4) for the passage of its particular stop rod 108. Each clamping block 118 is bored and threaded transversely as at 120 to receive a wing bolt 122 threaded therein and serving the purpose of a clamping screw for clamping each of the opposite workpiece end stop arms 112 at any desired location along its respective stop rod 108.

The work clamping unit 36 for the workpieces W (Figures 1, 2 and 4) is mounted upon a pair of laterally-spaced mounting brackets 124 (Figure 12) which are rabbeted as at 126 and secured by the screws 128 to the rearward and outer sides 130 and 132 respectively of bosses 100 (Figure 4). The brackets 124 are provided with parallel horizontal bores 134 (Figure 12) which receive parallel forwardly-extending clamping vise supporting rods 136. The rearward portions of the rods 136 are adjustably clamped in position by cylindrical clamping plugs 138 arcuately notched as at 140 and forming the heads of screws 142, the heads 138 being reciprocable in bores 144 disposed perpendicular to and immediately above the bores 134 and positioned to partially intersect the latter. Thumb screws or hand wheels 146 threaded upon the screw 142 and engaging the side walls 148 of the brackets 124 serve to move the screw heads 138 in the transverse bores 144 and consequently cause their notches 140 to snugly grip the vise supporting rods 136 in their adjusted positions.

Secured to the forward end of each of the vise supporting rods 136, as by a set screw 150, is the hub 152 of a clamping jaw supporting bracket 154, the hub 152 being bored as at 156 to receive the rod 136 (Figure 2). Each bracket 154 has a downwardly and rearwardly-extending arm 158, the opposite arms 158 being provided with aligned coaxial bores 160 (Figure 13) which serve as bearing bores for the eccentric opposite end portions 162 of a vise jaw clamping shaft 164, the main portion 166 of which is journaled in aligned bores 168 in the parallel opposite end walls 170 of a workpiece clamping vise jaw 172 having a rearward vertical workpiece engaging face 174 in its connecting wall 176 disposed parallel to the forward face 178 (Figure 4) of the front wall 64 of the base 34.

The vise jaw 172 at its opposite ends is provided with upstanding bosses 180 which are provided with parallel bores 182 slidably receiving and engaging the rods 136. The main portion 166 of the shaft 164 near one end thereof is bored transversely as at 184 (Figure 1) to receive the upper end of a clamping hand lever 186 by which the shaft 164 is rotated in order to move the vise jaw 172 back and forth so as to move its face 174 toward and away from the corresponding front face 178 of the base 34 in order to clamp or unclamp the workpiece W after it has been properly positioned between the bottom stops 38 and the end stops 40.

The motor control circuit 42 is supplied with electric power current through a conventional flexible two-conductor cable 188 (Figures 2 and 4) which passes through a suitably bored boss 190 in an access plate 192 secured to the rear wall 66 of the base 34 and covering an opening 194 therein. The conductors 196 and 198 (Figure 1) emerge from the cable 188 within the chamber 200 (Figure 1) inside the base 34 and enter a conventional control switch, generally designated 202, mounted on a mounting plate 204 which in turn is bolted or otherwise secured to an access plate 206 bolted to and covering an opening 208 (Figure 2) in the right-hand side wall 70 of the base 34. The switch 202 is provided with an operating handle 210 which, when swung to and fro between its "on" and "off" positions, starts or stops the driving motor of the cutting unit 54 by energizing or de-energizing the wires 212 and 214.

The wires 212 and 214 lead to a conventional relay 215 (Figure 1) associated with a suitable step-down transformer (not shown) which reduces the voltage from the wires 212 and 214 to a much lower control voltage. The lower voltage control current traverses wires 216 and 218 leading to and from a normally-open limit switch 220, preferably a so-called micro-switch mounted on an angle bracket 222 bolted to the under side of the upper wall 72 of the base 34. The limit switch 220 has an operating arm 224 pivoted thereto so as to actuate the switch pin 226 when a contact roller 228 is engaged by the conical surface 230 of a switch actuating stop 232 which is pinned or otherwise secured to a limit switch operating rod 234 which passes upward through a bore 236 (Figure 11) in the turntable 46 as well as through the bore 76 in the top wall 72 coaxial therewith. The upper end of the rod 234 is secured to and moves up and down with the carriage 52 in the manner described below. The actuation of the limit switch 220 by the conical stop 230 causes energization of the wires 238 and 240 leading to the cable 242 which conveys power current from the relay 216 to the motor 244 of the cutting unit 54.

*Cutting assembly and associated units*

The cutting assembly 44 which, as previously stated, is rotatably mounted upon the base 34 for rotational adjustment relatively to the base assembly 32, is supported upon the turntable 46 (Figure 11). For this purpose, the turntable 46 is provided with a pair of upstanding diametrically opposite bosses 250 which are provided with parallel bores 252 in which the reduced diameter lower ends of parallel vertical guide rods 254 are pinned or otherwise fixedly secured. Interconnecting the upper ends of the guide rods 254 is the approximately U-shaped bridge member 256 of the carriage raising and lowering unit 50 (Figures 1, 2 and 3) having a bridge portion 258 provided with end bosses 260 which are bored vertically to receive the upper ends of the guide rods 254 which are secured therein by set screws 262. Extending horizontally rearwardly from the bridge portion 258 of the bridge member 256 adjacent the bosses 260 are parallel arms 264 (Figure 3) having end bosses 266 bored to rotatably receive a cross shaft 268 carrying a retaining disc 270 bolted to one end and provided with a head 272 at its opposite end diametrically bored to receive the inner end of an operating lever 274.

The bosses 260 are provided with sockets 276 in which are anchored the outer ends of a double helical torque spring 278 having a central loop 280. The loop 280 engages and urges upward a crank arm 282, the hub of which is bored and pinned or otherwise secured to the cross shaft 268. Mounted in the outer end of the arm 282 is a pivot pin 284 which is engaged by the yoked upper end of a link 286, the yoked lower end of which engages a pivot pin 288 passing through an ear 290 rising from a boss 292 (Figures 2 and 5) on top of the cutting unit carriage 52.

The cutting unit carriage 52 is approximately H-shaped with parallel vertical end bosses 294 (Figure 1) bored vertically to slidably engage the parallel guide rods 254 along which they slide as the carriage 52 is raised and lowered by the hand feed lever 274 of the carriage raising and lowering unit 50. The central portion 296 of the H-shaped carriage 52 is provided with a horizontal annular boss 298 (Figures 1 and 5) having a horizontal bore 300 in which the cylindrical casing 302 of the cutter driving motor 244 is slidably mounted. The boss 298 and motor housing 302 are grooved to receive an elongated key 306 by which the motor casing 302 may be moved to and fro horizontally without rotating. This horizontal adjustment is achieved by means of a screw shaft 308 threaded through a threaded bore 310 in the boss 292 and rotatably mounted in the bore 312 of an upstanding arm 314 on the rearward end cap 316 of the casing 302 of the motor 244. A knurled hand wheel 318 pinned to the screw shaft 308 enables rotation thereof, and a thrust collar 320 also pinned thereto on the opposite side of the upstanding arm 314 prevents axial motion of the screw shaft 308.

The annular boss 298 of the carriage 52 has a rearwardly-disposed split annular portion 322 (Figure 5) separated therefrom by an arcuate slot 323 (Figure 2) and having a radial slot 324 parting the periphery of the annular portion 322. This slot 324 extends into the bore 300 and separates the opposite ends of the annular portion 322, which carry downwardly-projecting ears 326, one of which is threaded and the other bored to receive a clamping screw 328, to the outer end of which is pinned or otherwise secured the hub 330 of a clamping lever 332 (Figure 2).

Also extending downwardly from the forward portion of the annular boss 298 is a radial boss 334 which is bored and threaded as at 336 (Figure 5) to receive the correspondingly-threaded upper end of the rod 234. Projecting rearwardly from the vertical boss 260 (Figure 3) is a horizontal boss 338 which is bored vertically as at 340 to slidably receive a downwardly-extending stop rod 342, the lower end 343 of which is adapted to engage the upper surface 73 of the top wall 72 of the hollow base 74 when the carriage 52 and cutter 54 have been lowered to their lowermost desired positions, as explained below in connection with the operation of the invention. The boss 338 is transversely bored and threaded to receive a set screw 344 by which the stop rod 342 is clamped in its adjusted position.

*Adjustable eccentric tool-oscillating mechanism*

The adjustable eccentric tool-oscillating mechanism, generally designated 56, shown at the left-hand end of Figure 5 and also in Figures 6 to 10 inclusive, is mounted on the forward end cap 346 of the motor casing 302, this end cap being bolted thereto as at 348. The motor casing 302 contains a motor chamber 349 in which is mounted the electric motor 244 having a rotary motor shaft 350 extending through the bore 352 in the forward end cap 346. The latter has a hollow radial boss 354 projecting horizontally therefrom (Figures 1, 3 and 6) which at its outer end is provided with an end portion 356 with a hole 358 in the side wall thereof for the entry of the upper end of the flexible cable 242, the wires 238 and 240 of which supply electricity to the electric motor 244. An access plate 360 is bolted to the rearward side of the hollow boss 354 over an access opening 362 therein (Figures 3 and 6).

The motor casing end cap 346 has a flatly-machined front surface 366 and its upper part is provided with an upstanding boss 370 which has a horizontal bore or socket 372 in which a sleeve bearing 374 is mounted. Bolted as at 376 to the front motor end cap 346 is a cup-shaped cover 378 having a transverse diametral opening 380 closed by an access plate 382 which is bolted thereto as at 384. The cover 378 at its upper end is provided with a bore 386 (Figure 5) coaxial with the bore 372 in the front motor end cap 346 and provided with a cup-shaped sleeve bearing 388. Rockably mounted in the sleeve bearings 374 and 388 are the hollow front and rear ends 390 and 392 of a horizontal trunnion shaft 396 which is centrally bored as at 398 to receive the opposite ends of a tubular pivot rod 394 which interconnects the trunnion shaft ends 390 and 392 along their common axis, which is also the axis of the bores of the sleeve bearings 374 and 388. The trunnion shaft 396 also has a transverse vertical bearing bore 400 adapted to slidably engage the cylindrical bearing surface 402 of the circular cross-section upper arm 404 of an oscillating mortising tool mount or tool-holding lever, generally designated 406 (Figures 5 and 6). The tool mount 406 has a wear plate 368 recessed into and bolted to the rearward surface thereof and slidably engaging the end cap surface 366. The upper arm 404 is provided with a vertically-elongated machined slot 408 (Figure 6) which has parallel side walls slidably engaging the pivot rod 394.

The central portion of the tool mount 406 is provided with an annular enlargement 410 containing a horizontal counterbore or recess 412 in the center of which is a horizontal bore 414. Seated in the bore 414, which terminates in a smaller bore 416, is the outer race of an anti-friction bearing unit 418, the inner race of which is mounted on the reduced diameter portion 420 of a split eccentric collar 422 with an annular flange 424 midway between its opposite ends, and approximately midway between the reduced diameter portion 420 and an enlarged diameter portion 426. The enlarged diameter portion 426 contains a radial slot 428, the opposite sides of which are provided with coaxial tangential threaded and smooth bores 430 and 432 respectively (Figure 7). Threaded into the threaded bore 430 and passing through the smooth bore 432 is a clamping screw 434 which, when loosened, enables the collar 422 to be rotated relatively to a reduced diameter eccentric portion 436 of the motor shaft 350. The latter is snugly but adjustably received in an eccentric bore 438 running through the collar 422, thus making the collar 422 an eccentric collar. In this manner, the eccentric motor shaft portion 436 and the eccentric collar 422 together form a double eccentric with relatively rotatable parts giving a stroke varying device for varying the length of oscillation ultimately imparted to the periphery of the reduced diameter surface 420 of the collar 422 and through the anti-friction bearing unit 418 to the central portion 410 of the oscillating tool mount 406.

The flange 424 of the collar 422 (Figure 9) is drilled at circumferentially-spaced intervals with holes 440 to receive rivets 442 which pass through corresponding holes 444 in a semi-annular counterweight 446 having a central zero index mark 448 and an arcuate graduated scale 450 (Figure 6) by which the resultant eccentricity of the mechanism comprising the eccentric shaft portion 436 and the eccentric collar 422 may be indicated. Indication is made by a diametral slot 452 in the end of the eccentric portion 436 of the motor shaft 350, which also serves as a screw driver slot for receiving the end of a screw driver blade by which the motor shaft 350 is held stationary while the clamping screw 434 is loosened and the eccentric collar 422 and counterweight 446 rotated in order to vary the length of stroke of the oscillating tool mount 410. An arrow head 454 at one end of the slot 452 indicates the end thereof which is intended to register with the graduations 450 on the counterweight 446 riveted to the eccentric collar 422. A slot 456 (Figure 9) separates the split portion 458 of the collar 422 from the flange 424 thereof. The relative positions of the centers or axes of the motor shaft 350, its eccentric portion 436 and the eccentric collar 422 are shown in Figure 7 and respectively designated 460, 462 and 464. It will be obvious that the relative positions of the center 464 and the centers 460, 462 is varied by rotating the eccentric collar 422 relatively to the eccentric shaft portion 436.

The lower end of the oscillatable tool mount 406 terminates in a tool-carrying portion 466 (Figures 5 and 6) which is bored and counterbored with laterally-spaced holes 468 adapted to receive tool clamping bolts 470, the forward threaded ends of which carry tool clamping nuts 472. The tool-carrying portion 466 of the oscillatable tool mount 406 is rabbetted at 474 to receive the approximately rectangular plate-shaped upper end portion or base 476 of the mortising tool 54 which is drilled as at 478 with holes aligned with the bolt holes 468 for the passage of the shanks of the clamping bolts 470. The plate-shaped upper end portions 476 of the mortising tools 54 are all of the same size and shape so as to fit into the rabbetted portion 474 of the tool mount 406 and receive the various mortising tools 54 interchangeable with one another.

When the mortising machine of the present invention is used for making mortises or slots in wood, manual feeding by means of the carriage 52 and its raising and lowering mechanism 50 may be successfully carried out because of the softness of wood as a material for the workpiece W. When, however, the machine is used to make mortises in metal such as aluminum, steel or other relatively hard material, it is preferable to employ power-feeding mechanism such as is used in a conventional power feed of an ordinary drill press. Such a power feed enables the machine to be used with greater safety and freedom from tool breakage, in the same manner that a power feed on a conventional drill press saves drill breakage as compared with a manually-fed drill press. This power feeding mechanism for drill presses and the like is omitted from the drawings of the present invention in order to simplify the showing and because such mechanisms are conventional and well-known to those skilled in the machine tool art, and consequently are beyond the scope of the present invention.

Mortising tools

The mortising machine 30 makes use of any one of a series of widely varying mortising tools, all of which, however, have the same size and shape of base 476 in order to fit interchangeably into the rabbetted portion 474 at the lower end 466 of the oscillatable tool mount 406. The mortising tool 54 shown for purposes of example in Figures 1, 2, 5, 6 and 14 in addition to its interchangeable base 476 has a blade 480 roughly having the profile of a hip boot, with a shank portion 482, the front and rear edges 481 and 483 of which taper toward a neck portion 484 corresponding to the ankle of the boot. The latter thereafter widens into a foot portion or cutting tip 486 having a toe portion 488 with a cutting edge 490 and a heel portion 492 with a cutting edge 494. Between the forward and rearward cutting edges 490 and 494, the end surface 496 is approximately V-shaped with sides 498 and 500 of different inclinations terminating at a notch 502. The opposite sides 504 and 506 of the tool blade 480 are of different inclinations, the rearward surface 504 being vertical (Figure 5) and the forward surface 506 diverging outward and downward toward the end 496. This construction provides space in the hole for receiving the chips and expelling them as the tool blade 480 works its way downward into the hole it produces, as explained below in connection with the operation of the invention.

The modified mortising tool, generally designated 491, shown in Figure 23 is as regards its upper portion, identical in construction to the upper portion of the mortising tool 54 of Figure 6, but provides the additional feature of a cutting head 493 which is removably mounted on the cutting blade shank 495 in order to interchange cutting heads 493 for making mortises of different characteristics and for replacing worn out cutting heads without having to replace the entire tool. For this purpose, the cutting head 493 is provided with spaced ears 497 (only one of which is shown in Figure 23) spaced apart a distance equal substantially to the thickness of the lower end portion of the blade shank 495, which fits between the ears 497 into a recess having a flat bottom 499 against which the correspondingly flat lower end 501 of the cutting blade shank 495 fits.

This construction prevents undesired rotation of the cutting head 493 relatively to the cutting blade shank 495. The ears 497 and the cutting blade shank 495 are drilled in alignment to receive a clamping screw 503 which is countersunk into its adjacent ear 497 and has a hexagonal socket 505 adapted to receive a conventional wrench. The remaining portions of the mortising tool 491 are otherwise substantially the same as those of the mortising tool 54 and accordingly bear similar reference numerals. The base (not shown) is of course the same as the base 476 so as to be interchangeable therewith in the rabbetted portion 474 of the oscillatable tool mount 406.

It may be said here in passing that the tip 488 of the blade 480, because of its parallel front and rear cutting edges 490 and 494, makes holes such as mortises or slots 508 or 510 of Figures 15, 20 and 21, the holes 508 and 510 varying in length according to the length of the blade and the adjustment of the length of stroke of the oscillatable tool mount 406. The holes 508 and 510 remain of the same widths, however, with their side walls 512 and 514 parallel to one another. The front and rear end walls 516 and 518, however, while parallel, are separated at different distances from one another to make a different length of slot because of the different length of stroke of the tip 488 of the mortising tool 54. The bottom surface 520 of the hole or mortise 510 is slightly arcuate in an upwardly-concave direction (Figure 21) because of the oscillating motion imparted to the cutting tip 488 of the tool 54 by the eccentric tool-oscillating mechanism 56.

The side walls 512 and 514 of the mortises or slots produced by the tool 54 remain parallel and of the same widths as long as the width of the tip 488 remains the same. If the forward front and rear cutting edges 490 and 494 are made arcuate instead of straight, the mortise or slot 522 (Figure 16) is produced. The slot or mortise 522 has the same parallel side walls 512 and 514 but has arcuate end walls 524 and 526 corresponding to the arcuate shapes of the front and rear cutting edges 490 and 494 of the mortising tool 54. If the front and rear cutting edges 490 and 494 are inclined to converge toward one another, the trapezoidal slot or mortise 528 (Figure 17) is produced. This again has parallel opposite side walls 512 and 514 but has straight rearwardly converging end walls 530 and 532 respectively. On the other hand, if the front cutting edge 490 of the mortising tool 54 remains straight and the rear edge is rearwardly-inclined, it cuts a slot or mortise 534 as shown in Figure 18, wherein the front wall 536 remains perpendicular to the parallel side walls 512 and 514 but the rear wall 538 is inclined laterally thereto. If, instead, the front and rear cutting edges 490 and 494 of the mortising tool 54 are inclined to the opposite edges 481 and 483 of the cutting tool blade 480, but are made parallel to one another, the rhomboidal slot or mortise 540 of Figure 19 is produced. This accordingly has front and rear walls 542 and 544 respectively which are parallel to one another but which are inclined laterally at the same angles to the parallel side walls 512 and 514.

The modified mortising tool, generally designated 550, shown in Figure 22, is generally similar to the mortising tool 54 of Figure 7, but contains the additional feature of saw teeth 552 on its front edge 554, and having an additional cutting tooth 556 with a cutting edge 558 in the "instep" portion of the foot 560 between the toe portion 562 with its cutting edge 564 and the heel portion 566 with its cutting edge 568. The additional intermediate cutting tooth 556 with its cutting edge 558 assists the cutting action of the front and rear cutting teeth 562 and 566 and is separated from them by notches 570 and 572 respectively. This mortising tool 550 has a base of the same shape and size as the cutting tool 54 and is therefore designated with the same reference numeral 475 so as to be interchangeable with the mortising tool 54. The saw teeth 552 along its front edge 554 serve a chip-lifting function for expelling the chips out of deep mortises or other recesses, slots or holes produced thereby.

The further modified mortising tool, generally designated 574, shown in Figure 24, also possesses a base similar to the base 476 of the mortising tools 54 and 550 previously mentioned, and is therefore similarly designated. The mortising tool 574 has a blade 576 with a front edge 578 having saw teeth 580 thereon, a plain rear edge 582, and a bottom edge 584 having arcuately-disposed saw teeth 586 thereon, together with a front tooth 588 and a rear tooth 590. The mortising tool 574 is for the purpose of cutting elongated mortises or slots, such as a mortise or slot 592 shown in Figure 25. This has parallel side walls 594 and 596 placed very close to one another and with opposite end walls 598 and 600 spaced a considerable distance apart from one another so that the resulting slot 590 is long and narrow.

Operation

In the operation of the invention, let it be assumed that a workpiece W in the form of a rectangular block of material is to be provided with a mortise or series of mortises such as, for example, the mortise 510 shown in Figures 20 and 21, and that the side walls 512 and 514 of this mortise are to be parallel to the parallel opposite sides of the workpiece W. Let it be assumed, moreover, that a large number of identical workpieces W of this shape are to be provided with identical mortises 510 in identical locations. For this purpose, a mortising tool 54 is chosen with a cutting tip 486 having cutting edges 490 and 494 of the same width as the width of the mortise 510 to be cut, namely the widths of the opposite ends 516 and 518 (Figure 20). The turntable 46 is set with its index at zero on the degree scale 82 so as to position the axis of the horizontally-adjustable cutting unit 58 accurately perpendicular to the front face 178 of the base 34.

A master workpiece of the required dimensions with the mortise outline marked upon its upper surface is placed in the work-clamping unit or vise 36 between the front surface 178 of the base 34 and the rear surface 174 of the clamping jaw 172 (Figure 2). The wing nuts 98 on the bottom stop clamping bolts 90 (Figure 1) are loosened and the workpiece bottom stops 38 moved upward or downward in the conveyor T-slots 88 (Figure 2) until the top surface of the workpiece W is positioned at the desired level. The horizontally-adjustable cutting unit 58 is then adjusted back and forth by means of the screw shaft 308 and hand wheel 318 to properly position the cutting edges 490 and 494 of the cutting tip 486 of the mortising tool 54 at the desired distance from the front surface 178 of the base 34, which serves as a reference surface, whereupon the clamping lever 332 (Figure 2) is swung clockwise to clamp the unit 58 in its adjusted position. The workpiece W is then moved longitudinally back and forth until the desired position for the mortise is immediately below the mortising tool 54.

With the mortise or mortise outline, as the case may be, of the master workpiece W thus properly located immediately beneath the mortising tool 54, the lateral stroke of the tool 54 is then adjusted to cut the proper length of mortise 510. This is done by placing the tip of a screw driver in the slot 452 in the end of the eccentric portion 436 of the motor shaft 350 and, having loosened the eccentric clamping screw 434 with a screw driver or wrench, rotating the eccentric collar 422, at the same time observing the position of the arrowhead 454 with reference to the graduations of the graduated scale 450 on the counterweight 446 which is riveted to the collar 422. If the stroke of the cutting tip 486 of the cutting blade 480 of the mortising tool 54 is not already known with reference to the graduated scale 450, it is determined by a cut-and-try procedure by tightening the screws 434 at a given position and then rotating the shaft eccentric portion 436 a single revolution by the screw driver in the slot 452 and observing the extreme limits of travel of the forward and rearward cutting edges 490 and 494 of the cutting tip 486.

If this is not the correct stroke, the screw 434 is loosened and the eccentric collar 422 readjusted relatively to the eccentric shaft portion 436 and the screw retightened to repeat the test. When the correct stroke is achieved, a test is preferably made with the motor running so as to verify the setting by cutting an actual test mortise. The stop rod 342 is then set for the correct depth of mortise so that its lower end 343 engages the top surface 72 of the base 34 when the desired depth is reached.

When the adjustments for the desired length of stroke and depth of mortise have been thus completed, so that the mortise 510 will be of the desired dimensions (Figures 20 and 21), and the master workpiece W has been positioned beneath the cutting tool 54 in such a location that the mortise 510 will be cut in the desired place relatively to the ends of the workpiece W, the master workpiece W is clamped in position by swinging the hand lever 186 downward into the clamping position shown in Figures 2 and 13. This assumes, of course, that the thumb nuts 146 have been loosened and the vise jaw supporting rods 136 moved back and forth (Figures 1, 2 and 4) until the vise jaw 172 in its unclamped position with the clamping lever 186 raised is positioned with its clamping surface 174 suitably located relatively to the clamping surface 178 of the base 34 to freely receive the workpiece W in the unclamped position of the vise jaw 172 yet clamp it tightly in the clamped position thereof.

With the master workpiece W thus clamped in position with the mortise properly located below the mortising tool 54 and the stroke of the eccentric adjusting mechanism or tool oscillating mechanism 56 properly set, the workpiece end stops 40 are now positioned. This is done by loosening the wing bolts 122 and sliding the end stop arms 112 lengthwise along their respective rods 108 until the stop arms 112 engage the opposite ends of the master workpiece W. The wing bolts 122 are then tightened to clamp the end stop arms 112 in their adjusted positions. The machine is now ready for mass production operations.

The operator now selects workpiece blanks W to be mortised, these blanks being of the proper and accurate external dimensions to fit between the end stops 40 and on the bottom stops 38 so as to be clamped by the vise jaw 172 when the clamping lever 186 is swung downward into its clamping position (Figure 2). With the first workpiece blank thus clamped in position, the operator starts the motor 244 of the cutting unit 58 by swinging the switch arm 210 to its "on" position. The motor 244, however, does not start immediately because the limit switch 220 of the motor control circuit 42 (Figure 1) within the base 34 is in its normally-open position. The operator now grasps the hand feed lever 274 (Figure 2) and swings it toward him, thereby moving the carriage 52 and the cutting unit 58 thereon downward along the guide rods 254, consequently moving the stop rod 342 and limit-switch actuating rod 234. The consequent downward motion of the conical head 230 of the switch-actuating stop 232 within the base 34 (Figure 1) causes the head 230 to engage and shift the roller 228 and switch arm 224 to shift the switch pin 226 to its closed position, closing the limit switch 220. This in turn energizes the relay 215 to close the circuit between the incoming lines 212, 214 and the outgoing lines 238, 240 so as to energize the motor 244. The consequent rotation of the eccentric end portion 436 of the motor shaft 350 rotates in an oscillating path the eccentric collar 422 of the tool oscillating mechanism 56 and with it the inner race of the anti-friction bearing assembly 418. This oscillation is transmitted to the oscillatable tool mount 406 through the outer race of the anti-friction bearing assembly 418, so that the tool mount 56 swings to and fro and at the same time moves up and down (Figure 6), pivoting upon the pivot pin 394 in the elongated slot 409 while its cylindrical upper arm 404 reciprocates within the correspondingly cylindrical bore 400 of the trunnion shaft 396, which at the same time rocks in its coaxial bearing sleeves 374 and 388 (Figure 5).

The consequent oscillating motion of the tool-carrying portion 466 of the oscillatable tool mount 406 imparts an oscillating motion to the cutting tip 486 of the mortising tool 54, causing its forward and rearward cutting edges 490 and 494 to move in elliptical paths. The operator continues to swing the hand feed lever 274 to lower the carriage 52 and cutting unit 58 while the rapidly oscillating cutting tip 486 cuts its way into the workpiece W to form the mortise 510. The oscillation motion of the cutting tip 486 causes the chips, either of wood or metal as the case may be, to be kicked upward and ejected from the mortise 510 while the cutting edges 490 and 494 cut an arcuate bottom 520 in the mortise 510.

When the carriage 52 has been lowered so that the lower end 343 of the stop rod 342 engages the top surface 72 of the base 34, the mortise 510 has been formed of the required depth. The operator then retracts the carriage 52 upward by swinging the hand feed lever 274 backward, thereby halting the motor 244 and stopping oscillation of the mortising tool 54 when the stop collar 232 on the switch-actuating rod 234 releases the roller 228 of the limit switch 220 to open the motor circuit, as described above. This limit switch 220 is a safety feature of the motor control circuit 42 which prevents injury to the workman by preventing oscillation of the mortising tool 54 except when it is ready to enter the workpiece W.

The operator then unclamps the mortised workpiece W by swinging the vise clamping lever 186 upward (Figure 2) to move the vise jaw 172 outward, whereupon the mortised workpiece W is lifted out from its position between the bottom stops 38 and the end stops 40 and replaced with the next unmortised workpiece blank W. The latter is clamped by means of the clamping lever 186 and the mortising operations repeated as described above. In this manner, one after another of an indefinite number of workpieces W may be mortised in rapid succession, with the mortise always formed of the desired dimensions and at the same location.

The shape or length of the mortise may be changed as indicated in Figures 15 to 19 inclusive, by changing to a different mortising tool 54 having the cutting tip of the desired contour or outline where the length of the mortise is not conveniently adjusted by varying the stroke of the tool-oscillating mechanism 56, as described above. The mortises 508, 522, 528, 534 and 540 of Figures 15 to 19 inclusive have been described in connection with the construction of their respective cutting tools, hence require no further description. The special mortising tool 491 shown in Figure 23 is used in the same manner as the mortising tool 54 except that the cutting tip may be replaced by removing the clamping screw 503. The operation of the modified mortising tool 550 of Figure 22 is also similar to that of the mortising tool 54, except that the tool is especially adapted to the cutting of excessively long mortises, cutting by the cutting edges 564 and 568 being assisted by the intermediate cutting edge 558 upon the intermediate tooth 556. Moreover, the saw teeth 552 on its front edge 554 assist in expelling the chips from deep mortises.

The operation of the modified mortising tool 574 shown in Figure 24 for cutting a long narrow mortise 592 shown in Figure 25 is used in the same manner as the mortising tool 54. The multiple saw teeth 586 on the bottom edge 584 assist the front and rear cutting teeth 588 and 590 while the saw teeth 580 on the forward edge 578 of the blade 576 assist in expelling the chips. The result is a long narrow mortise 592 with widely separated ends 598 and 600 and narrowly separated sides 594 and 596 (Figure 25).

Mortises may be cut at oblique angles to the sides of the workpiece W by rotating the turntable 46 to the desired angle on the turntable scale 82 and the above-described operations repeated. Multiple mortises may be cut in a single workpiece by suitably moving the workpiece W, and the mortises may be formed "in echelon" by combining an oblique setting of the turntable 46 with moving the workpiece W, thereby producing multiple oblique mortises disposed parallel to one another or "in echelon," as it is commonly termed.

What I claim is:

1. A mortising machine comprising a base, an upstanding supporting structure mounted on said base with a vertical guideway thereon, a cutting head carriage slidably mounted on said guideway for vertical travel therealong, a cutting head mounted on said carriage and including a horizontally-disposed hollow casing, said cutting head having a vertically-disposed mortising tool mount oscillatably mounted on the forward portion of said casing, a motor-driven mount-oscillating device mounted on said casing and oscillatingly connected to said tool mount, an electric motor disposed in said casing and drivingly connected to said mount-operating device and a mortising tool carrier secured to said tool mount; and a workpiece holder mounted on said base beneath said cutting head, said cutting head carriage having a horizontal guideway thereon, and said cutting head casing having an elongated horizontally-disposed guideway-contacting portion reciprocably engaging said guideway for horizontal adjustment therealong.

2. A mortising machine comprising a base, a turntable mounted on said base, an upstanding supporting structure mounted on said turntable with a vertical guideway thereon, a cutting head carriage slidably mounted on said guideway for vertical travel therealong, a cutting head mounted on said carriage and including a hollow casing disposed substantially above the center of rotation of said turntable, said cutting head having a vertically-disposed mortising tool mount oscillatably mounted on the forward portion of said casing, a motor-driven mount-oscillating device mounted on said casing and oscillatingly connected to said tool mount, an electric motor disposed in said casing and drivingly connected to said mount-operating device and a mortising tool carrier secured to said tool mount; and a workpiece holder mounted on said base beneath said cutting head.

3. A mortising machine comprising a base, an upstanding supporting structure mounted on said base with a vertical guideway thereon, a cutting head carriage slidably mounted on said guideway for vertical travel therealong, a cutting head mounted on said carriage and including an electric motor mounted thereon and movable unitarily therewith, said cutting head having a mortising tool mount oscillatably mounted thereon, a motor-driven mount-oscillating device oscillatingly connected to said tool mount and drivingly connected to said motor, and a mortising tool carrier secured to said tool mount; and a workpiece holder mounted on said base beneath said cutting head, said carriage having a depth stop holder thereon and an elongated mortise depth stop member mounted in and depending from said depth stop holder for vertical adjustment relatively thereto and having at its lower end a contact portion engageable with said base in the lowered position of said carriage.

4. A mortising machine comprising a base, an upstanding supporting structure mounted on said base with a vertical guideway thereon, a cutting head carriage slidably mounted on said guideway for vertical travel therealong, a cutting head mounted on said carriage and including an electric motor mounted thereon and movable unitarily therewith, said cutting head having a mortising tool mount oscillatably mounted thereon, a motor-driven mount-oscillating device oscillatingly connected to said tool mount and drivingly connected to said motor, and a mortising tool carrier secured to said tool mount; a workpiece holder mounted on said base beneath said cutting head, a motor-energization circuit connected to said motor and having a normally-open limit switch mounted in said base, and a limit switch actuator including an elongated member connected to said carriage for travel therewith and having a switch-contacting portion extending into said base into switch-closing engagement with said limit switch in response to the lowering of said carriage to a predetermined level.

5. A mortising machine comprising a base, an upstanding supporting structure mounted on said base with a vertical guideway thereon, a cutting head carriage slidably mounted on said guideway for vertical travel therealong, a cutting head mounted on said carriage, said cutting head having a mortising tool mount oscillatably mounted thereon, a motor-driven mount-oscillating device oscillatingly connected to said tool mount, and a mortising tool carrier secured to said tool mount; and a workpiece holder mounted on said base beneath said cutting head, said workpiece holder including a stationary jaw mounted on said base, a plurality of horizontally-elongated movable jaw supporting members adjustably mounted for horizontal sliding adjustment motion on said base above said stationary jaw in horizontally-spaced parallel relationship, means for clamping said jaw-supporting members in temporarily-fixed adjusted positions relatively to said base, a movable jaw mounted on said jaw-supporting members for motion relatively thereto toward and away from said stationary jaw, and means for moving said movable jaw relatively to said jaw-supporting members and relatively to said stationary jaw into and out of clamping engagement with a workpiece placed between said jaws.

6. A mortising machine comprising a base, an upstanding supporting structure mounted on said base with a vertical guideway thereon, a cutting head carriage slidably mounted on said guideway for vertical travel therealong, a cutting head mounted on said carriage, said cutting head having a mortising tool mount oscillatably mounted thereon, a motor-driven mount-oscillating device oscillatingly connected to said tool mount, and a mortising tool carrier secured to said tool mount; and a workpiece holder mounted on said base beneath said cutting head, said workpiece holder including a stationary jaw mounted on said base, a plurality of horizontally-elongated movable jaw supporting members adjustably mounted for horizontal sliding adjustment motion on said base above said stationary jaw in horizontally-spaced parallel relationship, means for clamping said jaw-supporting members in temporarily-fixed adjusted positions relatively to said base a movable jaw mounted on said jaw-supporting members for motion relatively thereto toward and away from said stationary jaw, a movable jaw carrier mounted on each jaw-supporting member, a rotary eccentric shaft mounted on said carriers, said movable jaw being mounted on said eccentric shaft, and means for rotating said eccentric shaft to move said movable jaw relatively to said jaw-supporting members and relatively to said stationary jaw into and out of clamping engagement with a workpiece placed between said jaws.

7. A mortising machine comprising a base, an upstanding supporting structure mounted on said base with a vertical guideway thereon, a cutting head carriage slidably mounted on said guideway for vertical travel therealong, a cutting head mounted on said carriage, said cutting head having a mortising tool mount oscillatably mounted thereon, a motor-driven mount-oscillating device oscillatingly connected to said tool mount and including a rotary shaft, and a mortising tool carrier secured to said tool mount; and a workpiece holder mounted on said base beneath said cutting head, said tool mount including a trunnion member rockably mounted on said cutting head upon a rocking axis substantially parallel to the axis of rotation of said shaft, a tool-holding lever, pivotally and reciprocably engaging said trunnion member and having means thereon for securing a mortising tool thereto, and a rotary eccentric element oscillatably engaging said lever at a location spaced apart from said trunnion member and having an eccentric bore therein; and said mount-oscillating device including a motor drivingly connected to said rotary shaft, said rotary shaft having an eccentric portion thereon mounted in said bore in rotatably adjustable driving engagement with said eccentric element.

8. A mortising machine comprising a base, an upstanding supporting structure mounted on said base with a vertical guideway thereon, a cutting head carriage slidably mounted on said guideway for vertical travel therealong, a cutting head mounted on said carriage, said cutting head having a mortising tool mount oscillatably mounted thereon, a motor-driven mount-oscillating device oscillatingly connected to said tool mount and including a rotary shaft, and a mortising tool carrier secured to said tool mount; and a workpiece holder mounted on said base beneath said cutting head, said tool mount including a trunnion member rockably mounted on said cutting head upon a rocking axis substantially parallel to the axis of rotation of said shaft, a tool-holding lever pivotally and reciprocably engaging said trunnion member and having means thereon for securing a mortising tool thereto, and a rotary eccentric element oscillatably engaging said lever at a location spaced apart from said trunnion member and having an eccentric bore therein; and said mount-oscillating device including a motor drivingly connected to said rotary shaft, said rotary shaft having an eccentric portion thereon mounted in said bore in driving engagement with said eccentric element, said eccentric element being adjustably rotatable relatively to said eccentric shaft portion, and means for clamping said eccentric element in its adjusted position on said eccentric shaft portion.

References Cited in the file of this patent

UNITED STATES PATENTS

| | | |
|---|---|---|
| 35,420 | Joslin et al. | May 27, 1862 |
| 171,360 | Duck | Dec. 21, 1875 |
| 295,162 | Green | Mar. 18, 1884 |
| 366,822 | Du Franes | July 19, 1887 |
| 483,869 | Randle | Oct. 4, 1892 |
| 673,378 | Brown | May 7, 1901 |
| 766,607 | Ensign | Aug. 2, 1904 |
| 843,322 | Bontenakels | Feb. 5, 1907 |
| 1,210,270 | Brackett | Dec. 26, 1916 |
| 2,311,451 | Maurer | Feb. 16, 1943 |
| 2,471,014 | Trebert | May 24, 1949 |
| 2,479,293 | Bayless | Aug. 16, 1949 |

FOREIGN PATENTS

| | | |
|---|---|---|
| 246,060 | Switzerland | Aug. 16, 1947 |
| 549,566 | Germany | Apr. 29, 1932 |
| 919,664 | Germany | Nov. 2, 1954 |
| 3537/36 | Australia | Aug. 30, 1926 |